United States Patent [19]

Prandelli et al.

[11] 4,367,064
[45] Jan. 4, 1983

[54] MACHINE FOR THE PRODUCTION OF HOME-MADE PASTA AND DOUGH

[75] Inventors: Achille Prandelli; Roberto Prandelli, both of Concesio, Italy

[73] Assignee: Ottopran S.r.L., Collebeato, Italy

[21] Appl. No.: 265,947

[22] Filed: May 21, 1981

[30] Foreign Application Priority Data

May 23, 1980 [IT] Italy ................ 5160 A/80
Dec. 22, 1980 [IT] Italy ................ 5253 A/80

[51] Int. Cl.³ .................... A21C 3/04; A21C 11/20
[52] U.S. Cl. ..................... 425/204; 366/77; 366/98; 425/205; 425/376 R; 426/516; 426/557
[58] Field of Search ............. 425/200, 205, 206, 207, 425/208, 209, 324.1, 376 R; 426/496, 504, 516, 512, 519, 557; 366/77, 81, 96, 97, 98, 99

[56] References Cited

U.S. PATENT DOCUMENTS 2,531,224 11/1950 Lenner ................ 425/205
2,868,144 1/1959 Ambrette ............. 425/205

Primary Examiner—Willard E. Hoag
Attorney, Agent, or Firm—Sughrue, Mion, Zinn, Macpeak & Seas

[57] ABSTRACT

A machine for the production of home-made pasta and dough comprises a mixing bowl with a bladed shaft, an extrusion bowl and a feeding-measuring member rotatably supported between said mixing bowl and said extrusion bowl in order to feed said extrusion bowl with the mixture produced in said mixing bowl.

3 Claims, 8 Drawing Figures

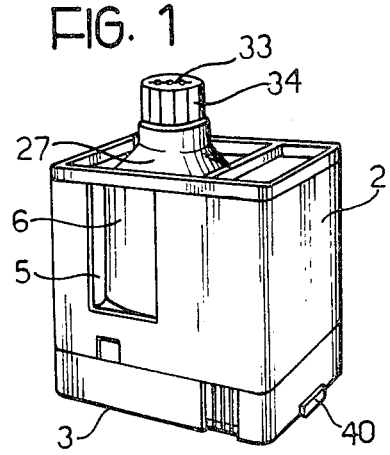
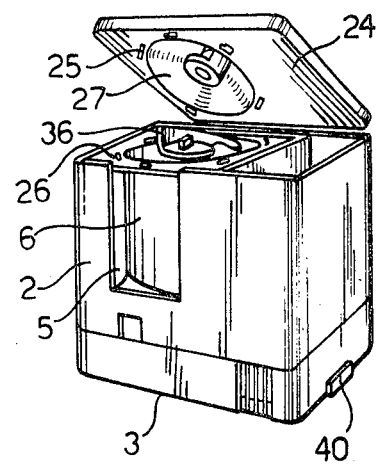
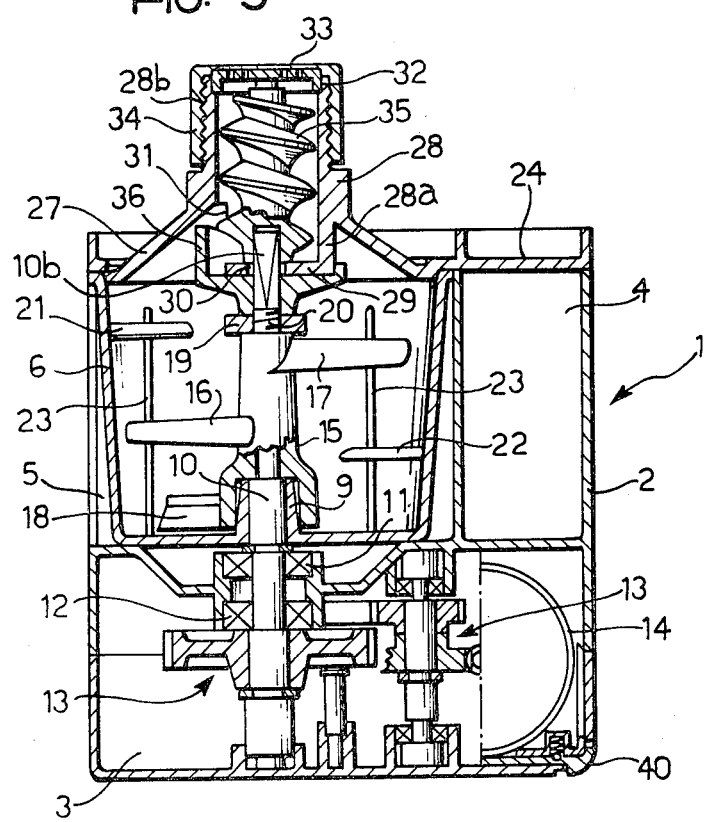

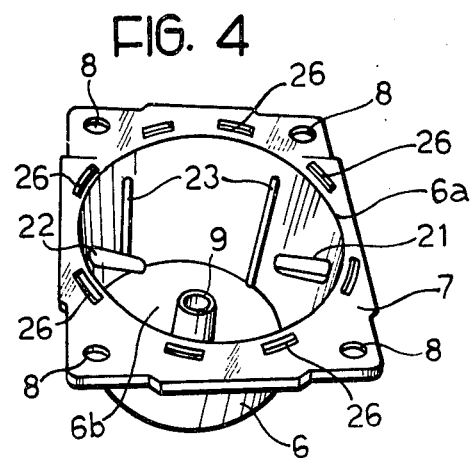
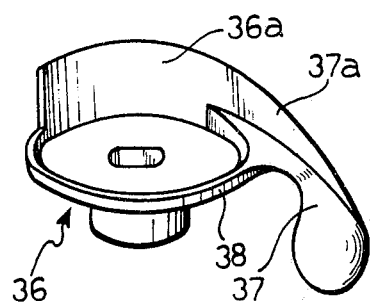
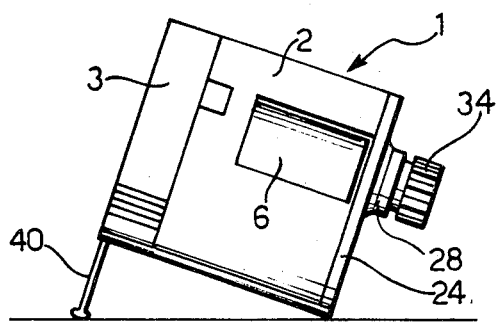
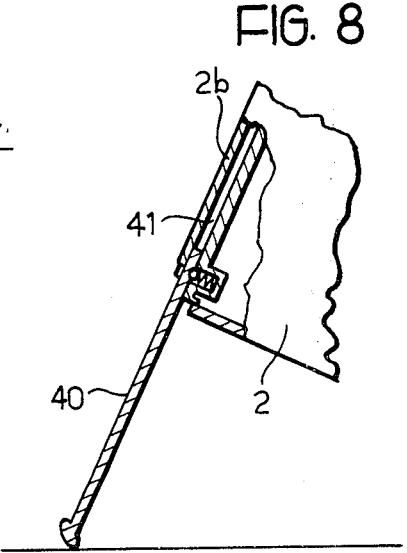

MACHINE FOR THE PRODUCTION OF HOME-MADE PASTA AND DOUGH

BACKGROUND OF THE INVENTION

The present invention relates to a machine for the production of home-made pasta and dough comprising a first bowl wherein a bladed shaft mixes and/or pre-kneads the ingredients of the dough which has to be produced and a second extrusion bowl wherein an Archimedean screw completes the ingredients kneading and extrudes it through a die in order to obtain the dough in the desired shape.

In the pasta and dough machines of the aforesaid type the ingredients mixing and pre-kneading bowl is generally supported above the extrusion bowl and communicates herewith through an adequate passage, the ingredients mixture being pushed by the bladed shaft towards and through said passage.

It is generally known that the proper and long lasting operating of these machines is not reliable and that said machines have a quite complex and therefore expensive structure. The frequent assembly and disassembly operations on said machines required for the cleaning and the maintenance of the elements thereof cannot be carried out easily and always involve the risk of wrong assembly which can cause breakings or deformations of some element and always result in a bad operating of the machine.

Machines having coaxial bladed shaft and extrusion screw, operating in the same bowl, have also been proposed. While on one hand these machines have a semplified and more handy structure compared to the machines mentioned above, on the other hand they present other not negligible technical disadvantages. As a matter of fact during the extrusion considerable thrusts are always generated therefore requiring an adequate oversize of the supports and of the whole structure of the single mixture and extrusion bowl. Moreover said thrusts are dangerously transmitted to the motor unit and to the supports there of possibly causing their damage.

In both the above machine types the extrusion bowl is fed with the ingredients mixture (and/or the pre-knead) in a not controlled that is not measured way. Therefore, considering the increased knead viscosities, despite the comparatively high power of the motor used to rotate the extrusion screw, a clamping of said screw can easily and rapidly take place in this bowl. In this case, after the machine has stopped working, it is necessary to manually remove the knead which will be thrown away, disassemble and clean all elements.

The main object of the present invention is to provide a machine for the production of home-made pasta and dough having structural and functional features allowing to overcome the above listed disadvantages referring to the prior art.

Another object of the present invention is to provide a machine for the production of home-made pasta and dough wherein the ingredients mixing bladed shaft and extrusion screw are aligned and wherein a device is provided in order to obtain an adequate measuring of the ingredients mixture.

A further object of the present invention is to provide a machine as described above comprising a small number of elements being easily accessible and easily reciprocally assembled.

SUMMARY OF THE INVENTION

Said and other objects which will become apparent from the description hereinafter made, are achieved by a machine for the production of home-made pasta and dough comprising:
- a mixing bowl wherein a bladed shaft is rotated in order to mix the ingredients of the dough,
- an extrusion bowl comprising a sleeve element having a portion extending inside said mixing bowl, an Archimedean screw rotatably arranged in said sleeve element in order to extrude the ingredients mixture through a die, an aperture longitudinally provided in said portion of said sleeve element,
- a feeding-measuring member consisting of a cylindrical cup shaped element, an arm having an L cross section tangentially projecting from said cup shaped element, said cup shaped element being arranged in the mixing bowl, coaxially surrounding said portion of the sleeve element and rotating integrally with the extrusion screw.

BRIEF DESCRIPTION OF THE DRAWINGS

One embodiment of a machine for the production of home-made pasta and dough according to the invention, will now be more particularly described, by way of example with reference to the accompanying drawings in which:

FIGS. 1 and 2 are perspective views of the machine according to the present invention in a closed and open position respectively.

FIG. 3 is a sectional view of the machine of FIGS. 1 and 2,

FIG. 4 is a perspective view of the mixing bowl of the machine of the preceding Figures, FIG. 6 is a perspective view of a component of FIG. 5, FIG. 7 is a diagramatic side view of the machine of FIGS. 1 and 2 in the extrusion step, and FIG. 8 is an enlarged scale component of FIG. 7.

DESCRIPTION OF A PREFERRED EMBODIMENT

Figure 5:
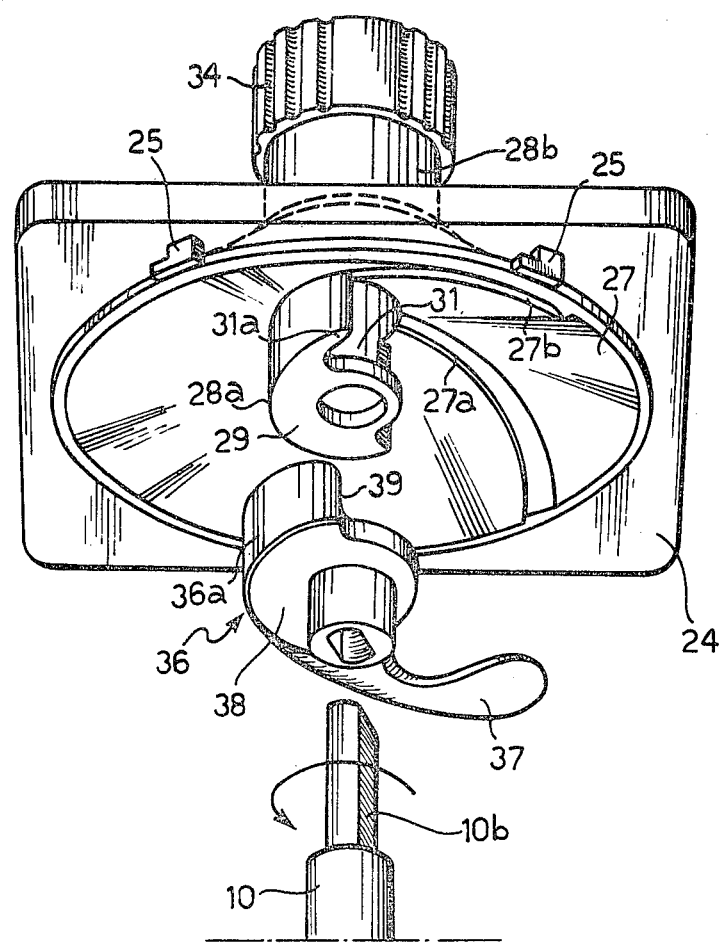
FIG. 5 is an exploded perspective view in enlarged scale of some components of the machine according to the present invention.

With reference to the above figures, a machine 1 for the production of home-made pasta and dough, has in its housing 2 a hollow basement 3 and two adjacent boxes 4 and 5 on it.

While box 4 is meant to contain accessories which are not shown, in box 5 a vessel 6 is positioned.

Said vessel 6 having an essentially frustoconical shape forms the mixing and/or pre-kneading bowl of the ingredients chosen for the pasta and dough production.

With reference to FIGS. 3, 4 and 5 said vessel 6 comprises at its entry 6a a rectangular and plate like edge 7, the vessel 6 being herewith fastened to the housing 2 of the machine. To this purpose four holes 8 engaged by threaded means (not shown) are provided in the edge 7.

A hub 9 provided in the bottom 6b of the vessel 6, is rotatably engaged by a driving shaft 10 which is supported by bearings 11, 12.

Gears 13, by which the driving shaft 10 is driven by an electric motor 14, are provided in the same basement 3.

Inside the vessel 6 a hollow shaft 15 provided with radial blades 16, 17 and 18 is keyed on said driving shaft 10.

The bladed shaft 15 is rotatably connected to the driving shaft 10 by conventional means, e.g. engaging corresponding portions of said shafts 10, 15 having rectangular and conjugated transversal sections.

In order to prevent axial movements of shaft 15 on shaft 10 and to assure a suitable position of shaft 15 in the vessel 6, a knob 19 which engages a threaded portion 20 of said shaft 10 is utilized.

In order to obtain a better mixture of the ingredients of the pasta and dough, the inside wall of the vessel 6 is longitudinally provided with a plurality of projecting edges 23 and radial fixed blades 21, 22.

With reference to FIGS. 3 and 5, a cover 24 for vessel 6 and box 5 is removable fixed on the machine housing 2, e.g. by bayonet joint means and counter means 25, 26.

In said cover 24 a conic part 27 tapered towards the outside of vessel 6 is provided. At the center portion of said conic part 27 an essentially sleeve element 28 forming the cylindrical extrusion bowl of machine 1 is fixed to cover 24.

The sleeve element 28 extends perpendicularly to cover 24 and has a portion 28a extending inside said vessel 6 and a portion 28b extending outside said vessel 6. The portion 28a is closed at the lower end by a closing element 29 provided with a hole 30 rotatably engaged by the upper portion 10b of the driving shaft 10. An aperture 31, having a predeterminated angular amplitude, preferably 180°, is longitudinally provided in the side wall of the portion 28a and connects the extrusion bowl 28 with the mixing vessel 6.

A seat 32 wherein a die 33 is removable locked by a threaded tap is provided at the upper end of the portion 28b of the sleeve element 28.

An Archimedean screw 35, keyed in a conventional way on the upper portion 10b of the driving shaft 10 is position adjusted in the extrusione bowl 28.

In FIGS. 3 and 5 a feeding-measuring member 36 for the extrusion bowl 28 is shown.

Said member consists essentially in an arm 37, having an essentially L shaped cross section, tangentially projecting from a cylindrical cup shaped element 38.

Said element 38 is keyed on the same upper portion 10b of the driving shaft 10 in such a position as to coaxially surround portion 28b of the sleeve element 28. An aperture 39 having a predeterminated angular amplitude particularly 180°, is provided in the wall 36a of the cup shaped element 38. Therefore, whenever the feeding-measuring member 36 turns around the axis of the driving shaft 10, the aperture 31 of the extrusion bowl 28 changes from a complete, open position (apertures 31 and 39 coincide) to the complete closed position.

Said feeding-measuring member 36 is removable keyed on the driving shaft 10 in a predeterminated angular position so that when apertures 31 and 39 coincide, the initial portion of the groove of the screw 35 faces aperture 31.

The arm 37 has an L shaped cross section, the flange 37a thereof, radiused to the upper wall 36a of the cup shaped element 38, has the upper profile tapered towards the free end in order to turn in contact with the conic wall 27.

A plate like supporting arm 40, movable guided in a suitable seat 41 provided in the wall 2b of the housing 2, is slidingly joint to said wall 2b.

Said plate like arm 40 is manually movable from a position completely inside the seat 41 to a position completely outside said seat. Said position is used during the pasta-dough extrusion step.

The ingredients (flour, water and/or eggs) for the production of the desired pasta/dough are measured in the vessel 6.

The feeding-measuring member 36 is then mounted on the upper portion 10b of the driving shaft 10. After having secured the cover 24 and positioned the screw 35 in the extrusion bowl 28, a selected die 33 is secured by the threaded tap 34 in the seat 32. The machine can now be operated.

After a preliminary ingredient mixing step, the machine 1 is set in the raking position shown in FIG. 8. In this position said mixture is moved towards the extrusion bowl 28 by the blades of the shaft 15 as well as by the gravity component.

At this point starts the feeding of the ingredients mixture in the extrusion bowl 28 through the relative aperture 31. The feeding is measured by the feeding-measuring member 36.

In fact, while turning around the axis of the driving shaft 10 the arm 37 of said member, co-operating with the conic part 27 of the cover 24, collects a small mixture quantity pushing it towards the aperture 31. To make this feeding easier and particularly to make sure that the predeterminated mixture quantity collected by the arm 37 enters the extrusion bowl 28, the aperture 31 is longitudinally delimited by an edge 31a tangentially overhanging for a section such as to graze the tapered flange 37a of said arm 37. Moreover two projections 27a, 27b having helicoidal shape, provided in the conic part 27 of the cover 24, cause the mixture quantity moved by the arm 37 to detach from the wall 27. As said arm 37 is angularly moved around the axis of the driving shaft 10, the light of the aperture 31 decreases more and more up to being completely darkened when said arm 37 has angularly exceeded the aperture. The feeding of the extrusion bowl 28 is therefore intermittent and controlled. The extrusion screw works in the best conditions and even the extrusion of the pasta/dough through the die 33 is carried out in the best operating conditions.

What is claimed is:

1. A machine for the production of home-made pasta and dough comprising:
   (i) a mixing bowl wherein a bladed shaft is rotated in order to mix the ingredients of the dough,
   (ii) an extrusion bowl comprising a sleeve element having a portion extending inside said mixing bowl, an Archimedean screw rotatably arranged in said sleeve element in order to extrude the ingredients mixture through a die, an aperture longitudinally provided in said portion of said sleeve element,
   (iii) a feeding-measuring member consisting of a cylindrical cup shaped element, an arm having an L cross section tangentially projecting from said cup shaped element, an aperture provided in the wall of the cup shaped element, said cup shaped element being arranged in the mixing bowl, coaxially surrounding said portion of the sleeve element and rotating integrally with the extrusion screw.

2. A machine according to claim 1 in which said bladed shaft, said feeding-measuring member and said extrusion screw are aligned and keyed on a driving shaft.

3. Machine for the production of home-made pasta and dough comprising:
  (i) a mixing bowl comprising a vessel, a cover for said vessel, a conical part in said cover, means for removably locking said cover on the vessel,
  (ii) an extrusion bowl comprising a sleeve element fixed at the central portion of said conical part of the cover, a portion of said sleeve element extending inside said vessel and an aperture longitudinally provided in said portion,
  (iii) a driving shaft extending through said vessel and inside said portion of the sleeve element,
  (iv) a hollow bladed shaft keyed on the driving shaft to rotate in said mixing bowl,
  (v) an extrusion screw keyed on the driving shaft to rotate in said sleeve element,
  (vi) a feeding-measuring member comprising a cup shaped element, an aperture provided in the wall thereof, an arm having an L cross section tangentially projecting from said cup shaped element, the flange of said L cross section arm being tapered towards the free end thereof, the cup shaped element surrounding said portion of the sleeve element is keyed on said driving shaft in a position in which the tapered flange of said arm substantially contacts the conical part of said cover.

* * * * *